United States Patent [19]

Hata et al.

[11] Patent Number: 4,614,002

[45] Date of Patent: Sep. 30, 1986

[54] AIRCRAFT CLEANING APPARATUS

[75] Inventors: Yoshitada Hata, Matsudo; Kazuyuki Katano, Hatachi; Isao Homma, Ibaraki, all of Japan

[73] Assignee: Hitachi, Ltd., Tokyo, Japan

[21] Appl. No.: 701,523

[22] Filed: Feb. 14, 1985

[30] Foreign Application Priority Data

Feb. 17, 1984 [JP] Japan .................................. 59-27003

[51] Int. Cl.⁴ .............................................. B64F 5/00
[52] U.S. Cl. .................................... 15/53 A; 15/97 B
[58] Field of Search ............. 15/21 R, 21 B, 21 C, 15/21 D, 21 E, 53 R, 53 A, 53 AB, 97 B

[56] References Cited

U.S. PATENT DOCUMENTS

| | | | |
|---|---|---|---|
| 3,439,372 | 4/1969 | Collier | 15/53 R |
| 3,835,498 | 9/1974 | Arato | 15/53 A |
| 4,514,933 | 5/1985 | Baskett | 15/21 E |

FOREIGN PATENT DOCUMENTS

| | | | |
|---|---|---|---|
| 0188796 | 11/1983 | Japan | 15/53 A |
| 0935381 | 6/1982 | U.S.S.R. | 15/53 AB |

Primary Examiner—Edward L. Roberts
Attorney, Agent, or Firm—Antonelli, Terry & Wands

[57] ABSTRACT

An aircraft cleaning apparatus for cleaning an aircraft body which is sectioned into some body sections to be cleaned comprises gate-type mobile structures disposed at each side of the aircraft, each of which carries a cleaning unit being movable in a direction of a longitudinal axis of the aircraft and cleaning the aircraft body sections. The gate-type mobile structure can move in both directions parallel to and perpendicular to the longitudinal axis of the aircraft.

7 Claims, 11 Drawing Figures

AIRCRAFT CLEANING APPARATUS

BACKGROUND OF THE INVENTION

The present invention relates to an apparatus for cleaning up a body surface of an aircraft, and more particularly to an apparatus capable of easily cleaning up the aircraft body surface with minimal devices.

An aircraft cleaning apparatus has been known, in which, as disclosed in Japanese Patent Laid-open Publication No. 188796/83, a plurality of cleaning devices are disposed in the opposite sides of an aircraft, the body of which is sectioned along a longitudinal axis of the aircraft into a plurality of body sections. Each of cleaning devices is so arranged and disposed as to clean up exclusively the corresponding aircraft body sections.

The known apparatus can improve a cleaning efficiency considerably but suffers from the following problems. Namely, since a plurality of cleaning devices (at least six devices) have to be used for cleaning the respective body sections, a plurality of brushes, power supplies and other equipment are required, so that the cost of the apparatus is increased. In addition, the use of a plurality of cleaning devices requires a complicated operation and control therefor in order to ensure that the aircraft is cleaned up with a high reliability.

SUMMARY OF THE INVENTION

Accordingly, an object of the invention is to provide an aircraft cleaning apparatus which causes a reduction of the cost and can be controlled by a simple manner.

Another object of the invention is to provide an aircraft cleaning apparatus having a reduced weight.

To these ends, according to the invention, there is provided an aircraft cleaning apparatus for cleaning aircraft body sections one by one, to which an aircraft body is sectioned along the longitudinal axis thereof, the apparatus comprising: mobile structures disposed at opposite sides of an aircraft to be cleaned, each mobile structure carrying cleaning devices which can clean the body sections and be movable in a direction of the longitudinal axis of the aircraft, the mobile structures being movable in a direction parallel to the longitudinal axis and in a direction perpendicular to the longitudinal axis, thereby to allow the cleaning devices to clean up the aircraft.

A preferred embodiment of the invention will be described hereinunder with reference to the accompanying drawings.

DESCRIPTION OF THE PREFERRED EMBODIMENT

Figure 1:
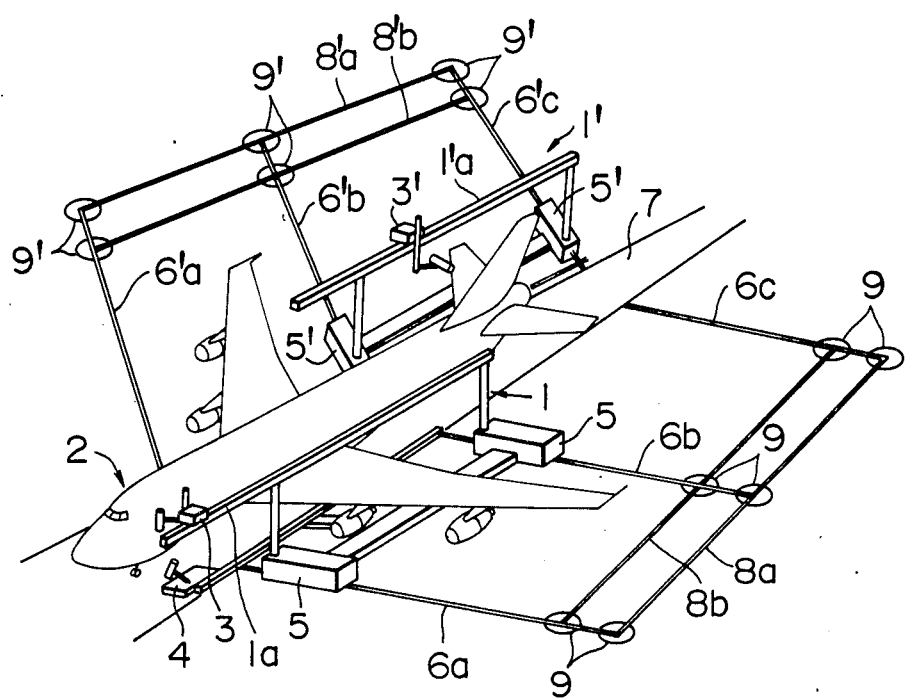
FIG. 1 is a perspective view showing an aircraft cleaning apparatus in accordance with the invention.

Referring first to FIG. 1, a pair of mobile structures 1 and 1' are symmetrically disposed at opposite sides of an aircraft 2 to be cleaned. The mobile structure 1 is provided with a first and a second cleaning devices 3 and 4 which are movable in a direction of a longitudinal axis of the aircraft. Similarly, the mobile structure 1' is also provided with a first and a second cleaning devices 3' and 4'. The cleaning devices 3 and 4, and 3' and 4' are arranged symmetrically in respect of the axis of the aircraft. The mobile structures 1 and 1' are provided with driving units 5 and 5' for driving the respective mobile structures in a direction generally perpendicular to the axis of the aircraft and in a direction generally parallel to the axis of the aircraft. Each driving unit includes a motor, a gear box and so on. Rails 6a to 6c and 6a' to 6c' are disposed on the ground at opposite sides of a taxiway 7 and disposed symmetrically with respect of the axis of the aircraft 2. The rails 6a to 6c and 6a' to 6c' extend horizontally and substantially perpendicularly to the axis of the aircraft. Rails 8a and 8b, and 8a' and 8b' are laid on the ground so as to extend horizontally in parallel with the axis of the aircraft such as to cross the end portions of the rails 6a to 6c' remote from the aircraft. The structures 1 and 1' can run along the rails 6a to 6c or 8a, 8b and the rails 6a' to 6c' or 8a', 8b', respectively through the driving units 5 and 5'. More specifically, three rails 6a to 6c or 6a' to 6c' on each side of the aircraft 2 are disposed at regular intervals. Therefore, the mobile structure 1 can run along the two access rails 6a and 6b and gain access to a front portion of the aircraft 2 by means of the driving units 5 when it is desired to clean up the aircraft 2. The mobile structure 1', of course, also can gain access to the aircraft 2 in the same manner. When it is required to move the structure 1 from one aircraft body section to another section so as to clean up it, the mobile structure 1 is first moved away from the aircraft 2 along the access rails 6a and 6b towards the translation rails 8a and 8b. Then, steering devices (not shown) on the driving units 5 and 5 steer at the intersections between the access rails and the translation rails the structure 1 to the translation rails 8a and 8b. The structure 1 then runs along the translation rails 8a and 8b towards a rear portion of the aircraft 2. After the driving units 5 and 5 come to ride the access rails 6b and 6c, the steering devices operate to steer the mobile structure 1 towards the aircraft and to gain access to the rear portion of the aircraft 2, as in the case of the mobile structure 1' in FIG. 1. At rail intersections, turning tables 9 and 9' having rail portions are provided. Each turning table 9 is turned so as to make the raillet align with the access rails 6a to 6c and 6a' to 6c' or with the translation rails 8a to 8b and 8a' to 8b'.

Figure 2:
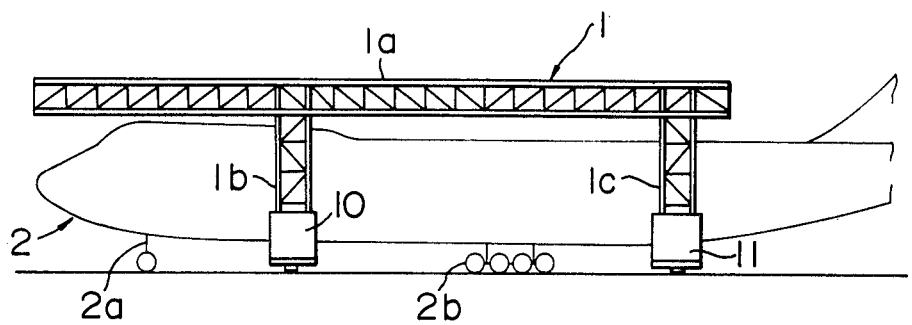
FIG. 2 is a side view showing a mobile structure incorporated in the cleaning apparatus shown in FIG. 1.

Referring now to FIG. 2, the mobile structure 1 is composed of an upper horizontal beam 1a mounted on the tops of posts 1b and 1c. The beam 1a and the posts 1b and 1c have a truss-construction as is known per se. A Diesel generator 10 is provided on the base portion of the post 1b for supplying a power required for the cleaning operation, while a liquid supply equipment 11 is provided on the base portion of the post 1c for supplying the water and/or the detergent to the aircraft body sections to be cleaned.

Figure 3:
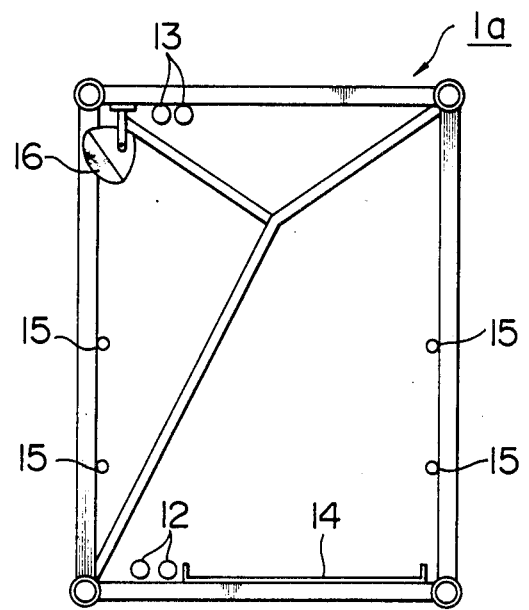
FIG. 3 is a cross-sectional view of the mobile structure shown in FIG. 2.

FIG. 3 shows a cross-section of the upper horizontal beam 1a. As will be seen from this Figure, the horizontal beam 1a is a rectangular cross-sectional truss and incorporates fluid pipes 12 for the water and the detergent, conduits 13 through which a power line and controlling lines run, a scaffold 14, and handrails 15. Lamps 16 are also mounted on suitable portions of the beam 1a for the night work.

Figure 4:
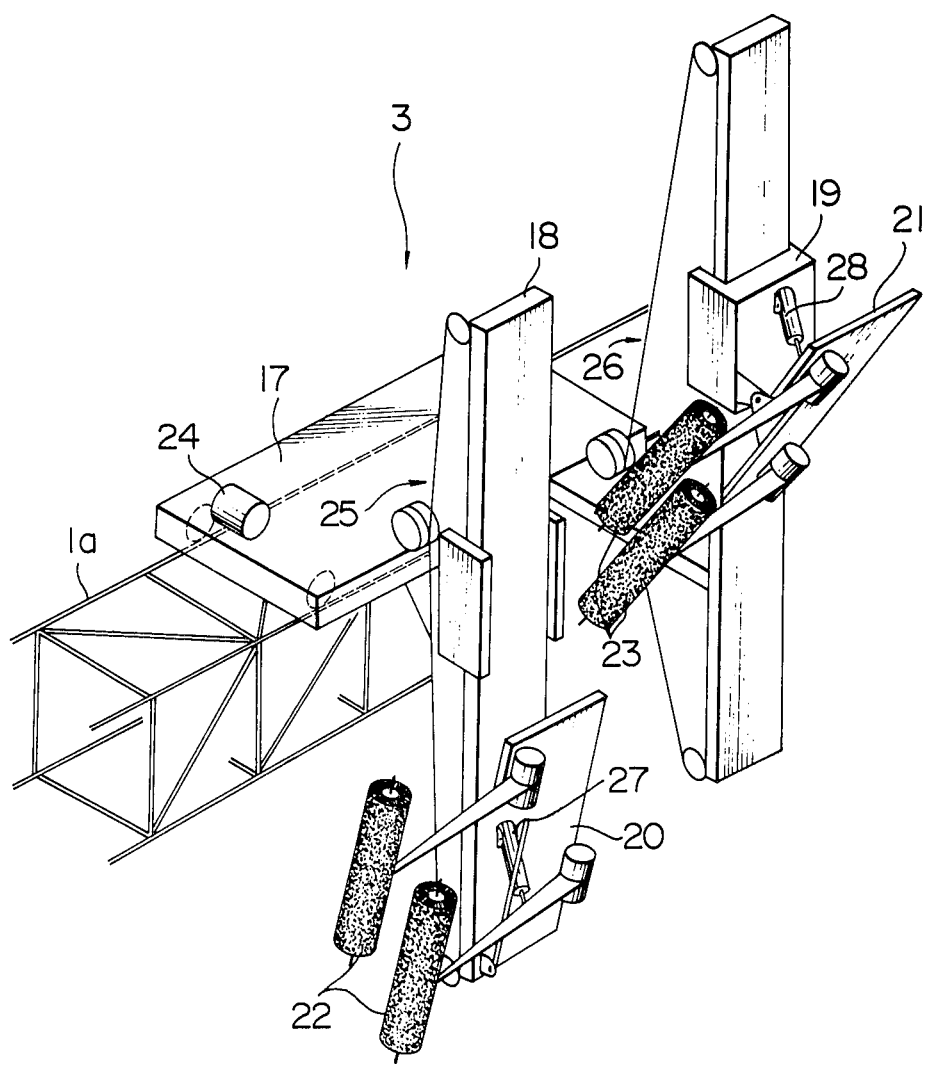
FIGS. 4, 5 and 6 are illustrations showing the respective cleaning devices.

FIG. 4 shows the first cleaning device 3 which is movably guided on the horizontal beam 1a. The device 3 is constituted by a mobile truck 17 movable in the direction of the longitudinal axis of the aircraft, movable members 18 and 19 mounted on the mobile truck 17 for movement in the vertical direction, frames 20 and 21 mounted to the respective movable members 18 and 19 for tilting motion around horizontal axes, and washing brushes 22 and 23 mounted to the respective frames 20 and 21. These brushes 22 and 23 have cylindrical forms made of an elastic material such a polyurethane, chloroplene, polyethylene or the like. The mobile truck 17 is moved along the beam 1a in the direction of the longitudinal axis of the aircraft by means of a driving unit 24 which is provided with a motor, a gear box and so on. The movable members 18 and 19 are moved vertically by means of lifting units 25 and 26 provided on the mobile truck 17. Each movable member 18 or 19 is moved up and down through a rope which is driven by a drum drivingly connected to a motor (not shown) through a gear box. Each frame 20 or 21 may be tilted about horizontal axes by means of a tilting device such as cylinder 27 or 28 provided on the movable members 18 and 19.

Figure 5:
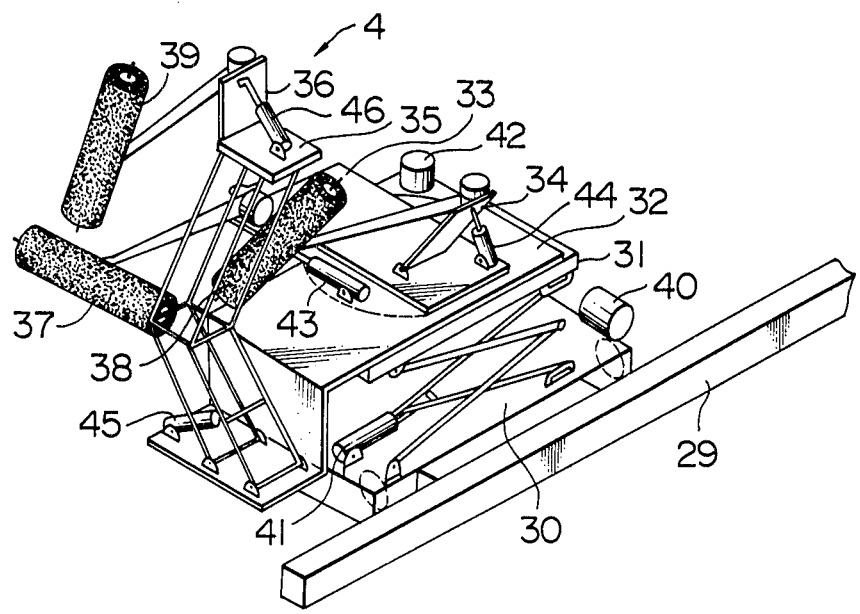

FIG. 5 shows the second cleaning device 4 which is movably guided on a guide 29 extending at lower end portions of the posts in the longitudinal direction of the beam 1a. The second cleaning device 4 includes a mobile truck 30, a frame member 31 vertically movably provided above the mobile truck 30, a turn table 32 mounted on the frame member 31 for turning motion about a vertical axis through a roller bearing, a frame 33 mounted on the turn table 32 for horizontal movement, a frame 34 provided on the frame 33 for tilting motion about a horizontal axis, a table 35 provided above the turn table 32 for vertical movement, a frame 36 mounted on the table 35 for tilting motion about a horizontal axis, and washing brushes 37, 38 and 39 supported by the respective frames 33, 34 and 36. The mobile truck 30 is moved along the guide 29 in the direction of longitudinal axis of the aircraft at the foot portion of the mobile structure 2 by a driving unit 40 similar to the unit 24.

The frame member 31 is moved up and down by a cylinder unit 41 and a pantagraph link mechanism provided on the mobile truck 30. The turn table 32 is turned on the frame member 31 around a vertical axis by a turning device including a motor and a gear box and so on. The frame 33 is driven horizontally by a driving unit 43 mounted on the turn table 32. The frame 34 is tilted about a horizontal axis by a tilt cylinder 44 mounted on the frame 33. The table 35 is moved vertically up and down above the turn table 32 by a cylinder 45 mounted thereto. The frame 36 is tilted about a horizontal axis by a tilt cylinder 46 on the table 35.

Figure 6:
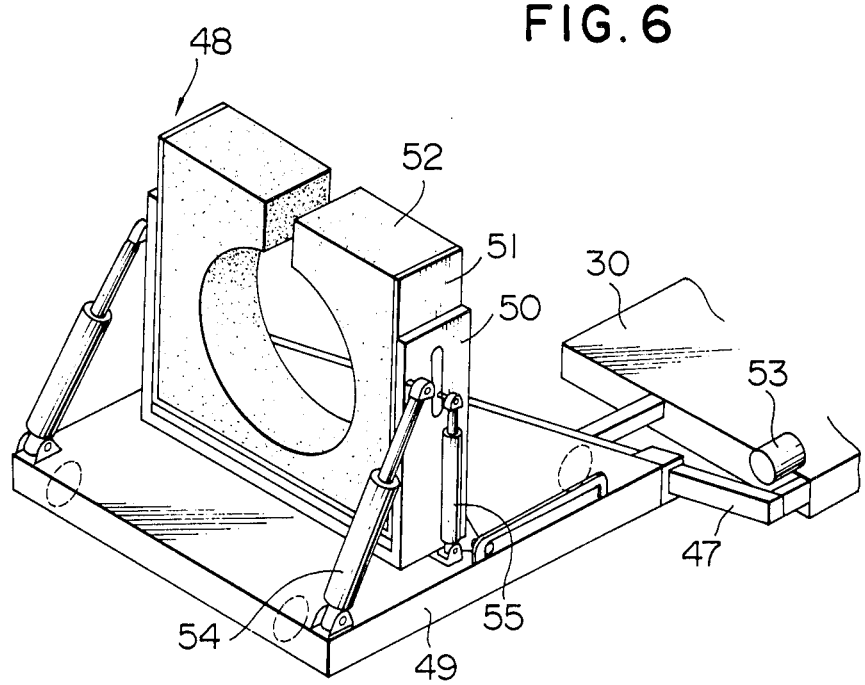

FIG. 6 shows an engine cover cleaning device 48 which is towed by the mobile truck 30 and is movable in a horizontal direction inclined to the towing direction along a guide member 47 provided on the mobile truck 30. The engine cover cleaning device 48 is constituted by a trailing truck 49, a frame 50 provided above the trailing truck 49 and swingable about a horizontal axis, a sub frame 51 telescoped into the frame 50 for vertical movement, and a washing brush 52 made of an elastic material and secured to the sub frame 51. The trailing truck 49 is towed by the mobile truck 30 and moved in the longitudinal direction of the beam, i.e., in the direction of the longitudinal axis of the aircraft, together with the cleaning device 4. Furthermore, the trailing truck 49 is guided by the guide member 47 and moved in the horizontal direction inclined to the towing direction by a driving unit 53 including a motor and a gear box. The frame 50 is tilted about a horizontal axis by tilt cylinders 54 above the trailing truck 49. The sub frame 51 is moved vertically along the frame member 50 by driving cylinders 55.

Figure 7:
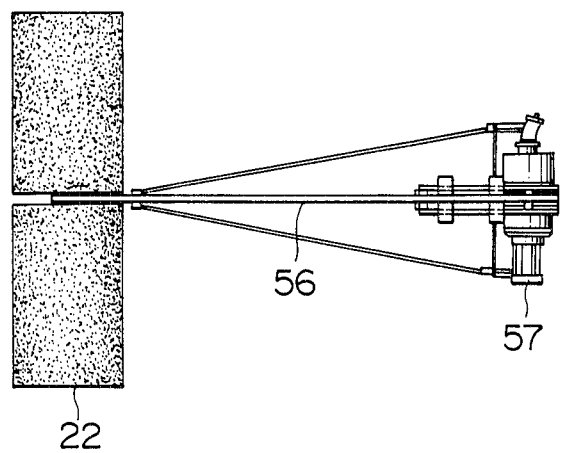
FIGS. 7 and 8 are illustrations of the mounting of a washing brush.
Figure 8:
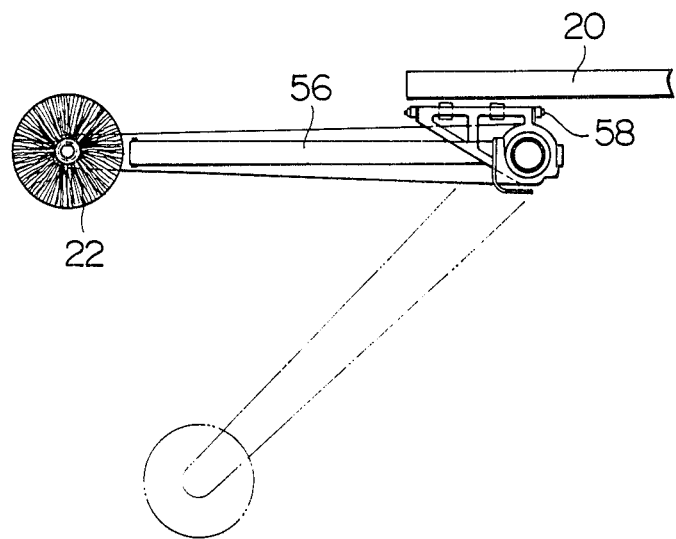

An explanation of the brush mounting will be made hereinunder with reference to FIGS. 7 and 8 illustrating the brush 22 on the frame 20 by way of example. The brush 22 is mounted on a distal end of a supporting arm 56 and rotated by a driving motor 57. The supporting arm 56 is swingable up and down about the axis of the driving motor 57. The driving motor 57 itself is mounted to the frame 20 for rolling about a rolling pin 58.

The operation of the aircraft cleaning apparatus described hereinbefore will be explained.

The standing mobile structure 1 is placed at a position remote from the aircraft, i.e., at a position where the rails 6a and 6b cross the rails 8, 8. The aircraft 2 to be cleaned is moved along the taxiway 7 and positioned at a predetermined position. Sequentially the mobile structure 1 is moved along the rails 6a and 6b and is stopped at a position adjacent to the end of the wing of the aircraft. Subsequently, the cleaning device 3 and 4 are moved and stopped at positions where the brushes thereof contact a leading edge of the wing. The movable member 18 of the cleaning device 3 is then moved downwardly (FIG. 4) and the frame 20 is tilted to the horizontal position so that the brush 22 is moved to a position near the upper surface of the wing. Meanwhile, the frame member 31 of the cleaning device 4 is moved upwardly to bring the brushes 37 and 38 to positions near the lower surface of the wing (FIG. 5). Then, the supporting arms of respective brushes are moved downwardly or upwardly so as to bring the brushes into contact with the surfaces of the wing while rotating the brushes. While rotating the brushes, the cleaning devices 3 and 4 are moved from the leading edge towards the trailing edge of the wing in the direction of the longitudinal axis of the aircraft to clean up the upper and lower surfaces of the wing sections. When the brushes have reached the trailing edge of the wing, the brushes are moved apart from the wing surface and the cleaning devices are stopped. Then, the mobile structure 1 is moved towards the aircraft by a distance corresponding to the axial length of the brush, and the abovedescribed operation is repeated to clean up the upper and lower surfaces of the other wing section. When the engine cover cleaning device 48 has reached an aircraft engine during cleaning of the lower surface of the wing, the trailing truck 49 is moved in the inclined horizontal direction along the guide member 47 and then the brush 52 is moved upwardly so as to embrace the engine cover. In this state, the cleaning device 4 is moved in the direction of the longitudinal axis of the aircraft, so that not only the surfaces of the engine cover but the upper and lower surfaces of the wing are cleaned up. However, when it is not required to clean up the engine cover, the brush 52 is tilted in a horizontal position so that the engine cover cleaning device 48 can move under the wing.

Then, the body of the aircraft is cleaned in the following manner. The mobile structure 1 is positioned at the ends of the rails 6a and 6b remote from the turning tables 9 and the cleaning devices 3 and 4 are moved towards the nose of the aircraft 2. Then, the brushes are arranged so as to embrace the aircraft body by moving the frames and tables vertically and by tilting thereof. While the brushes are rotated in contact with the surface of the aircraft body, the cleaning devices 3 and 4 are moved towards the tail end of the aircraft body, so that a part of the aircraft body surface is cleaned up as far as the cleaning devices 3 and 4 can move. During the cleaning of the lower surface of the aircraft body by the cleaning device 4, in order to avoid that the nose gear 2a of the aircraft 2 (FIG. 2) interferes with the brushes 37 and 38, the frame 33 is moved horizontally to allow the brushes to clear the nose gear. When the cleaning device 4 approaches the main gear 2b of the aircraft 2 (FIG. 2), the turn table 32 is turned to change the orientation of the brushes, so that the brushes can approach close to the main gear 2b sufficiently and clean up a larger area.

After the wings and the front portion of the body of the aircraft are cleaned up, the mobile structure 1 is moved along the rails 6a and 6b back to the turning tables 9. The orientation of the driving units 5 and 5 is changed and then the mobile structure 1 runs on the rails 8a and 8b towards the tail of the aircraft 2. When the mobile structure 1 reaches the turning tables 9, the orientation of the driving units 5 and 5 is changed again and the mobile structure 1 is driven towards the aircraft along the rails 6b and 6c. The cleaning operation to the tail end portion of the aircraft body is conducted substantially in the same manner as the front portion of the aircraft.

An explanation will be made hereinunder as to the positions of the brushes in the respective cleaning steps with reference to FIGS. 9 to 11.

Figure 9:
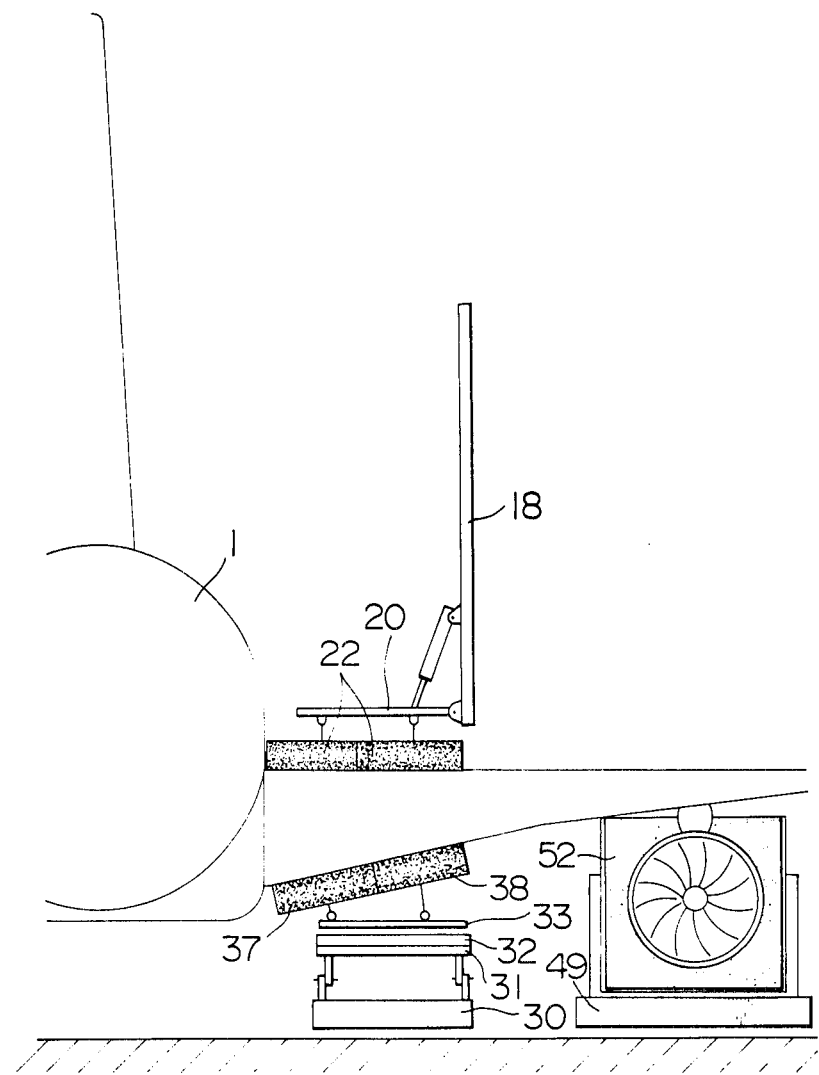
FIGS. 9, 10 and 11 are illustrations of the operations of the brushes in different positions.

Referring first to FIG. 9, the cleaning operation for the main wing will be explained first. The frame 20 is tilted to the horizontal position and the movable member 18 is moved vertically so as to make the brushes 22 of the cleaning device 3 come into contact with the upper surface of the wing. In order to clean up the lower surface of the wing, the frame member 31 is moved vertically and the frame 33 is moved so as to make the brushes 37 and 38 come into contact with the lower surface of the wing. For the purpose of cleaning the engine cover, the brush 52 of the engine cover cleaning device 48 shown in FIG. 6 is pulled up to the upright position as illustrated.

Figure 10:
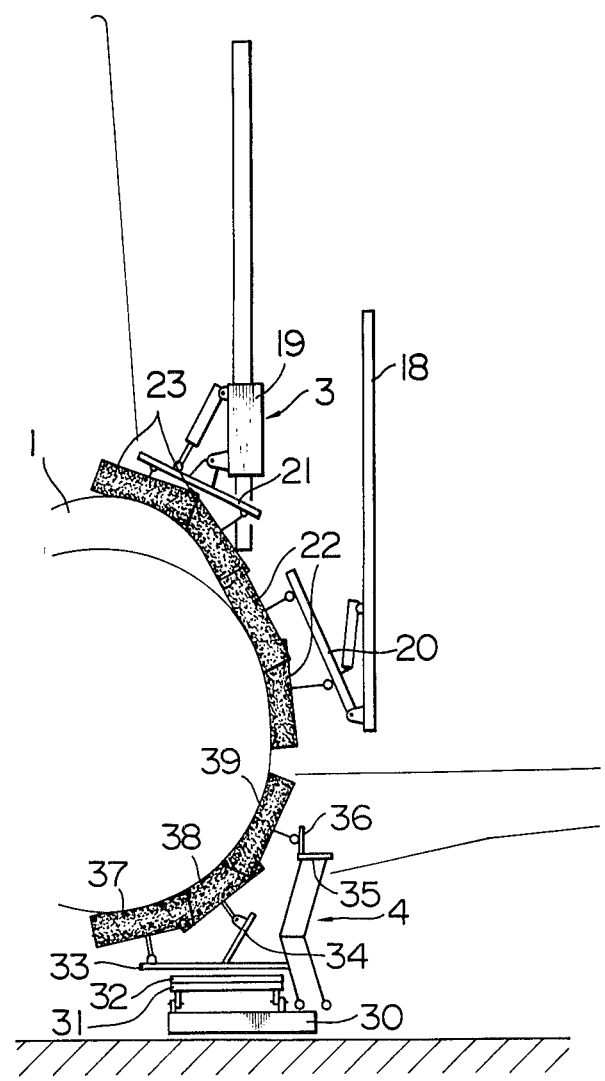

FIG. 10 illustrates the operation for cleaning the body of the aircraft. The frame 20 carrying the brushes 22 are held in a rather vertical position, while the frame 21 carrying the brushes 23 is held in a rather horizontal position. The movable member 18 and 19 carrying the respective frames 20 and 21 are moved vertically to make the brushes 22 and 23 come into contact with and clean up the upper part of the aircraft body. The lower part of the aircraft body is cleaned by the brushes 37, 38 and 39 of the cleaning device 4 shown in FIG. 5. In this case, the frame 34 carrying the brush 38 is held in an opportunity vertical position, while the frame 33 carrying the brush 37 is extended horizontally towards the central area of the lower part of the aircraft body. As stated before, when the brushes 37 and 38 pass the nose gear 2a, the frame 33 is retracted to avoid the interference therebetween. In order to allow the retraction of the frame 33, the frame 36 carrying the brush 39 is pulled up and the table 35 mounting the frame 36 is raised. Since the brush 39 is not used in the cleaning of the lower surface of the wing, the frame 36 is laid horizontally and the table 35 is lowered except for the cleaning of the aircraft body surface, so that undesirable interference between the brush 39 and the wing is avoided during the movement of the cleaning device 4 under the wing.

Figure 11:
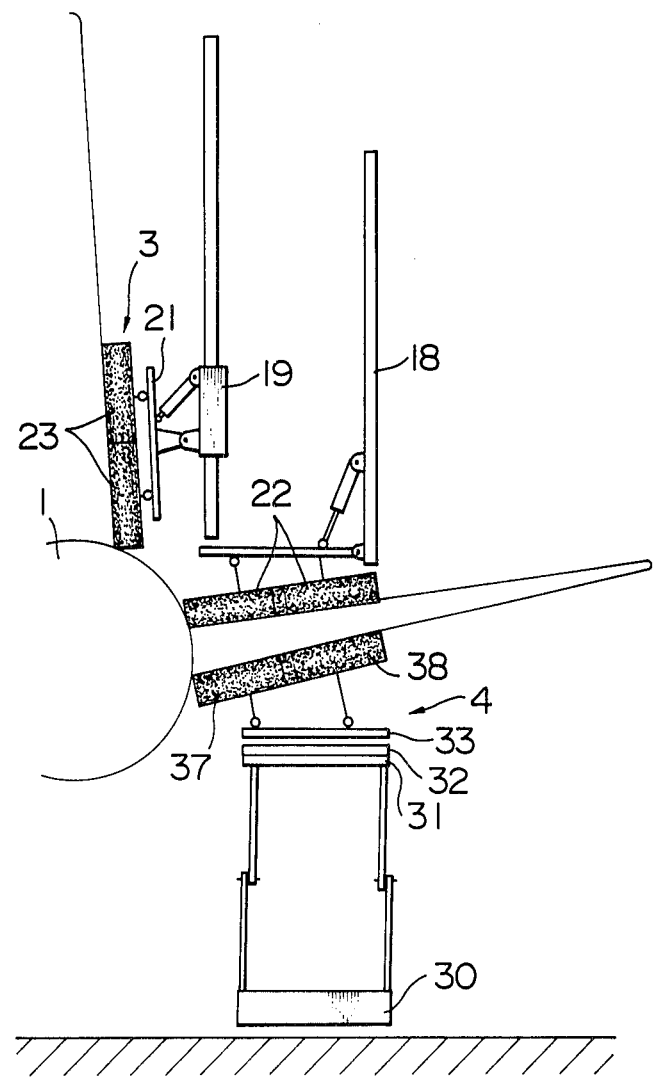

Referring to FIG. 11, the cleaning operation for the horizontal tail and the vertical tail of the aircraft will be explained. The brushes and the frames of the cleaning devices 3 and 4 are used for the horizontal tail in the same manner as for the main wing.

The cleaning of the vertical tail is conducted by the cleaning brush 23 on the cleaning device 3. To this end, the frame 21 carrying the brush 23 is so held in a vertical position as to come in contact with the surface of the vertical tail and the movable member 19 is moved vertically to clean up the whole surface of the vertical tail.

Although the operations have been described only with respect to one side of the aircraft, it will be clear to those skilled in the art that this operation can be applied to the other side of the aircraft in the same way as that described hereinbefore, considering that the aircraft cleaning apparatus is arranged in symmetry with respect to the longitudinal axis of the aircraft.

The operation may be controlled manually for successive steps of cleaning operation or, alternatively, automatically in accordance with instructions given by a controller which stores the data concerning the size and shape of the aircraft.

The use of the rails is not essential. Namely, the mobile structures 1 and 1' may be provided with rubber tires so that they may freely run on the ground surface.

In the described embodiment of the aircraft cleaning apparatus of the invention, one operator boards the respective cleaning devices 3, 4, 3' and 4' of the mobile structures 1 and 1'.

According to the invention, comparatively small-sized mobile structures are accessible to the front and tail end portions of the aircraft for cleaning thereof since they can move in the direction of the longitudinal axis of the aircraft at a position remote from the body of the aircraft. When rails 6a to 8b are used, the extreme movements of the mobile structures are prevented by these rails so that the mobile structures do not interfere with the aircraft.

The truss-type construction of the mobile structure reduces the wind load thereto, as well as its weight. The structure also permits an easy installation of facilities such as scaffold, piping and wiring by an efficient use of the space within the truss-type structure, so that materials is saved and the weights are reduced.

Furthermore, since the positions and the levels of the brushes are adjustable, it is possible to clean an ample area of the surfaces of the aircraft with smaller number of brushes. In consequence, the installation and maintenance costs are reduced and the reliability is improved advantageously.

According to the invention, a gate-type mobile structure movable both in the longitudinal and transverse directions of the aircraft is disposed at each side of the aircraft, and cleaning devices are mounted on each mobile structure. This arrangement ensures a high degree of cleaning of the aircraft and permits a simplification of the apparatus, which in turn reduces the cost and facilitates the operation and control, thereof.

What is claimed is:

1. An aircraft cleaning apparatus for cleaning aircraft body sections along a longitudinal axis thereof, said apparatus comprising mobile means disposed on each side of said aircraft at a height which is just sufficient to pass above wing and tail surfaces of said aircraft, said mobile means carrying cleaning means for cleaning said aircraft body sections and being movable on rail means in a direction parallel to said longitudinal axis as well as in a direction substantially perpendicular thereto, said cleaning means being movable in a direction of said longitudinal axis of said aircraft.

2. An aircraft cleaning apparatus according to claim 1, said rail means comprising: first rail group means, each extending substantially perpendicularly to said longitudinal axis of said aircraft, on which said mobile means runs close to said aircraft for cleaning one of said body sections; and second rail group means, each extending substantially in parallel to said longitudinal axis of said aircraft at a portion remote from said aircraft, on which said mobile means runs in order to clean up another body section.

3. An aircraft cleaning apparatus according to claim 1, wherein said mobile means has truss-type construction, an interior of which fluid pipes, conduits for electric wires and so forth are disposed on.

4. An aircraft cleaning apparatus according to claim 1, wherein said mobile means includes an upper horizontal beam and a foot portion, and said cleaning means includes a first cleaning device movable in the direction of the longitudinal axis of said aircraft along the upper horizontal beam of said mobile means, and a second cleaning device movable in the direction of the longitudinal axis of said aircraft along a guide disposed on the foot portion of said mobile structure.

5. An aircraft cleaning apparatus according to claim 4, wherein said first cleaning device includes a movable member mounted for vertical movement, and a supporting frame provided with brushes and mounted on said movable member for tilting motion about a horizontal axis, whereby an upper part of said aircraft body, upper surface of a main wing, upper surface of a tail and a vertical tail are cleaned.

6. An aircraft cleaning apparatus according to claim 4, wherein said second cleaning device includes a frame member movable in a vertical direction, a table mounted on said frame member for turning about a vertical axis, and frame carrying brushes and mounted on said table not only for a horizontal movement but for tilting motion about a horizontal axis, whereby a lower part of said aircraft body, lower surface of the main wing and the lower surface of the tail are cleaned.

7. An aircraft cleaning apparatus according to claim 6, said apparatus further comprising an engine cover cleaning device which includes a trailing truck towed by said second cleaning device and movable along a guide provided on said second cleaning device in a horizontal direction perpendicular to the towing direction or inclined to the towing direction, a frame provided on said trailing truck and tiltable about a horizontal axis, and a sub frame carrying a washing brush and vertically movably mounted on said frame, whereby a cover of an engine under the main wing is cleaned.

* * * * *